(12) United States Patent
Florance et al.

(10) Patent No.: US 10,789,278 B1
(45) Date of Patent: Sep. 29, 2020

(54) DATABASE SEARCH ENGINE OPTIMIZATION

(71) Applicant: CoStar Realty Information, Inc., Washington, DC (US)

(72) Inventors: Andrew Florance, San Francisco, CA (US); Jack Spivey, Atlanta, GA (US); Robert Berton Jennings, El Cerrito, CA (US)

(73) Assignee: CoStar Realty Information, Inc., Washington, DC (US)

( * ) Notice: Subject to any disclaimer, the term of this patent is extended or adjusted under 35 U.S.C. 154(b) by 332 days.

(21) Appl. No.: 15/639,236

(22) Filed: Jun. 30, 2017

Related U.S. Application Data

(60) Provisional application No. 62/356,844, filed on Jun. 30, 2016.

(51) Int. Cl.
*G06F 16/29* (2019.01)
*G06Q 50/16* (2012.01)
(Continued)

(52) U.S. Cl.
CPC .......... *G06F 16/29* (2019.01); *G06F 16/9535* (2019.01); *G06F 16/9537* (2019.01); *G06Q 50/16* (2013.01)

(58) Field of Classification Search
CPC ............................ G06F 16/951; G06F 16/958
(Continued)

(56) References Cited

U.S. PATENT DOCUMENTS

2003/0195877 A1* 10/2003 Ford .................. G06Q 30/02
2006/0122918 A1* 6/2006 Graboske ............ G06Q 10/10
705/30

(Continued)

FOREIGN PATENT DOCUMENTS

CA          2293174 A1 *  6/2000  ............. G06F 17/60

OTHER PUBLICATIONS

Monson, Matt, "Valuation using Hedonic Pricing Models," Cornell Real Estate Review, vol. 7, Article 10, pp. 62-72, 2009, available at < https://scholarship.sha.cornell.edu/cgi/viewcontent.cgi?article=1058&context=crer > (Year: 2009).*

(Continued)

*Primary Examiner* — Minnah L Seoh
*Assistant Examiner* — Richard W. Crandall
(74) *Attorney, Agent, or Firm* — Fish & Richardson P.C.

(57) ABSTRACT

Methods, including computer programs encoded on a computer storage medium, for improving database functionality. In one aspect, a method includes: in response to receiving a query for data associated with one or more properties, accessing listing information for multiple, different communities within which multiple, different types of properties are physically located; selecting, from among the different communities, a particular set of communities; determining that a value of one or more properties within the selected particular set of communities is missing or stale; obtaining an initial estimate of the value of one or more properties within the particular set of communities; defining a cost function that depends on a set of parameters, optimizing the cost function to generate a set of optimal parameters, and obtaining an updated estimate of the value of each property within the particular set of communities based on the generated set of optimal parameters.

20 Claims, 5 Drawing Sheets

(51) Int. Cl.
*G06F 16/9535* (2019.01)
*G06F 16/9537* (2019.01)

(58) Field of Classification Search
USPC .......................................... 705/313
See application file for complete search history.

(56) References Cited

U.S. PATENT DOCUMENTS

| | | | |
|---|---|---|---|
| 2010/0057538 A1* | 3/2010 | Hardman | G06Q 40/06 705/313 |
| 2010/0281036 A1* | 11/2010 | Inoue | G06F 16/90335 707/749 |
| 2014/0257924 A1 | 9/2014 | Xie et al. | |
| 2015/0242747 A1* | 8/2015 | Packes | G06N 3/0454 706/17 |

OTHER PUBLICATIONS

"Playing with Regression prediction and MSE measure," Jan. 11, 2016, [online], available at: < https://tomaztsql.wordpress.com/2016/01/11/playing-with-regression-prediction-and-mse-measure/ > (Year: 2016).*

Montero and Larraz, "Interpolation Methods for Geographical Data: Housing and Commercial Establishment Markets," Journal of Planning Education and Research, vol. 33, No. 2—2011, pp. 233-244 (2011), available at: < http://pages.jh.edu/jrer/papers/pdf/past/vol33n02/04.233_244.pdf >, (Year: 2011).*

Niedrich, Matt, "An Introduction to Gradient Descent and Linear Regression," [online], published on Jun. 24, 2014, available at: < https://spin.atomicobject.com/2014/06/24/gradient-descent-linear-regression/ > (Year: 2014).*

* cited by examiner

US 10,789,278 B1

DATABASE SEARCH ENGINE OPTIMIZATION

RELATED CASES

This application claims benefit of U.S. Provisional Application No. 62/356,844, filed Jun. 30, 2016, which is herein incorporated by reference in its entirety.

FIELD

The present specification relates to search engines.

BACKGROUND

In recent years, online search services have changed the way that people obtain information on assets and services of their interest. Users are now able to navigate up-to-date listings for assets and services using a variety of different communication devices (e.g., smart phones, personal computers, personal digital assistants (PDAs), etc.), and are doing so with increasing regularity.

SUMMARY

Although users of online real estate search services may have vast amounts of real estate information at their fingertips, they are often faced with the burdensome task of sifting through listings that include incomplete information. The techniques described herein may, for instance, be leveraged by websites or mobile applications associated with online real estate services to enhance user experience by more quickly connecting users with property listings that provide reliable insight into property pricing.

In particular, the techniques described herein may enable various unknown values of properties to be estimated based on known values of other properties. For example, certain values may be unknown as missing or may be stale. A value may be stale if a time associated with the value is older than a threshold or if the value was not provided in a latest stream of data or within a threshold number of most recent streams of data. In addition to enhancing the user experience providing by such services, the techniques described herein may also be useful to others who directly or indirectly use such services, such as property managers/owners, real estate agents and developers, in that the property value estimation techniques described herein may be leveraged to, for example, provide such entities with suggestions of rental or sale prices at which to advertise specific properties, analytics on pricing schemes being used by competitors, automated pricing services that streamline the property listing process, and the like.

Some technical advantages provided by the techniques described herein include increasing the accuracy of an estimate and enhancing the database functionality by providing a more robust and accurate set of data. Thus, for example, the described techniques enable a user to obtain desired results with fewer queries, resulting in fewer database accesses, and also less re-rendering of search results, all of which reduce the processing load and network traffic associated with reissuing refined queries. Another technical advantage provided by the techniques described herein is that an estimate for a particular variable may be calculated even if the known data upon which the estimate relies would otherwise be too sparse for conventional techniques. Thus, the described techniques realize efficiencies in populating a database and improved search results provided in response to a query.

In some aspects, the subject matter described in this specification may be embodied in methods that may include the actions of receiving a query for data associated with one or more properties; in response to receiving the query, accessing listing information for multiple, different communities within which multiple, different types of properties are physically located; selecting, from among the different communities, a particular set of communities within which multiple, different properties are physically located, wherein the multiple, different properties that are physically located within the particular set of communities represent a particular quantity of different types of properties and include the one or more properties for which the query was received; determining that a value of one or more properties that is physically located within the selected particular set of communities is missing or stale; obtaining an initial estimate of the value of one or more properties that is physically located within the particular set of communities; defining a cost function that depends on a set of parameters, wherein the set of parameters (i) include one parameter for each type of property included in the particular quantity of different types of properties, and (ii) have values that are initialized based on the initial estimates of values of the one or more properties; optimizing the cost function with respect to the set of parameters to generate a set of optimal parameters; obtaining, based on the generated set of optimal parameters, an updated estimate of the value of the one or more properties that is physically located within the particular set of communities; and providing for output the updated estimate of the value of the one or more properties that is physically located within the particular set of communities as responsive to the received query for data associated with one or more properties.

Other implementations of this and other aspects include corresponding systems, apparatus, and computer programs, configured to perform the actions of the methods, encoded on computer storage devices. A system of one or more computers can be so configured by virtue of software, firmware, hardware, or a combination of them installed on the system that in operation cause the system to perform the actions. One or more computer programs can be so configured by virtue of having instructions that, when executed by data processing apparatus, cause the apparatus to perform the actions.

These other versions may each optionally include one or more of the following features. In some implementations, the actions may further include, in response to selecting the particular set of communities, determining, based on the listing information, a value of each property included in a subset of the properties that are physically located within the particular set of communities. In such implementations, obtaining an initial estimate of the value of each property that is physically located within the particular set of communities may include obtaining, based on the determined values of the subset of properties, an initial estimate of the value of each property that is physically located within the particular set of communities.

In such implementations, obtaining an initial estimate of the value of each property that is physically located within the particular set of communities may, in some examples, include determining, based on the determined values of the subset of properties, a naïve initial estimate of the value of each property that is physically located within the particular set of communities. Determining a naïve initial estimate may, in some instances, include applying linear interpolation to the determined values of the subset of properties.

In such examples, the cost function may be given by:

$$J(C, G) = \frac{1}{m} \sum_{(b,i) \in G} (x_{b,i} - estimate_{b,i})^2$$

In the cost function, C represents the set of parameters, G represents the particular set of communities, b represents an index for each community included in the particular set of communities, i represents an index for each of the multiple, different types of properties that are physically located within the particular set of communities, m represents a quantity of the determined values of the subset of properties, $x_{b,i}$ represents a determined value of a property of type i that is physically located within community b, and $estimate_{b,i}$ represents an estimate of the value of a property of type i that is physically located within community b, where each $estimate_{b,i}$ is dependent on the set of parameters C.

In some of such examples, $estimate_{b,i}$ may be given by:

$$estimate_{b,i} = mean\left(\frac{x_{b,1}}{c_1}, \ldots, \frac{x_{b,n}}{c_n}\right) * c_i,$$

In this equation, n represents a total quantity of the multiple, different types of properties that are physically located within the particular set of communities.

In some of such implementations, obtaining, based on the generated set of optimal parameters, an updated estimate of the value of each property that is physically located within the particular set of communities includes, for each property of type i that is physically located within community b and is not included in the subset of properties, determining a ratio of the determined value of each property that is physically located within community b and is included in the subset of properties divided by the optimal parameter that corresponds to the type of each property that is physically located within community b and is included in the subset of properties, respectively, determining a mean value of the determined ratios, and multiplying the determined mean value by the optimal parameter that corresponds to properties of type i.

In some instances, the cost function may, in such implementations, further depend on the determined values of the subset of properties. In some of such implementations, the listing information may (i) specify the values of the subset of the properties that are physically located within the particular set of communities, and (ii) not specify the values of properties that are physically located within the particular set of communities other than the subset of properties.

In some implementations, optimizing the cost function with respect to the set of parameters may include performing gradient descent on the cost function with respect to each parameter in the set of parameters.

In some examples, the actions may further include indexing each type of property that is physically located within the particular set of communities according to one or more features of the each type of property as indicated in the listing information. In some of these examples, the one or more features may include a quantity of bedrooms and/or a quantity of bathrooms that are included in each type of property. In addition, the one or more features may, in some of these examples, further include a quantity of parking spots included with each type of property, a quantity of balconies or patios included with each type of property, and/or a size of each type of property.

In some implementations, selecting, from among the different communities, the particular set of communities within which multiple, different properties are physically located, may include determining, based on the listing information, that the particular set of communities satisfy a set of criteria. In some examples, the listing information may, in such implementations, indicate each community's geographic location. In such examples, determining, based on the listing information, that the particular set of communities satisfy the set of criteria may include determining, based on the listing information, that each community included in the particular set of communities is geographically located within a predefined geographic region.

In some examples, the value of each property that is physically located within the particular set of communities may be a recurring rental value of each property.

In some implementations, accessing listing information for multiple, different communities within which multiple, different types of properties are physically located may include accessing listing information for multiple, different buildings within which multiple, different types of units are physically located.

In some aspects, the subject matter described in this specification may be embodied in methods that may include the actions of determining a number of buildings and unit types in a particular area, accessing known rental costs of one or more unit types in the particular area, based on the accessed known rental costs, generating an initial estimate of the rental cost of each unit type in the particular area, defining a cost function, where the cost function is dependent on a set of parameters and the accessed known rental costs, optimizing the cost function with respect to the set of parameters to generate a set of optimal parameters, and determining estimates of the rental cost of all unit types in the particular area using the generated set of optimal parameters.

Other implementations of this and other aspects include corresponding systems, apparatus, and computer programs, configured to perform the actions of the methods, encoded on computer storage devices. A system of one or more computers can be so configured by virtue of software, firmware, hardware, or a combination of them installed on the system that in operation cause the system to perform the actions. One or more computer programs can be so configured by virtue of having instructions that, when executed by data processing apparatus, cause the apparatus to perform the actions.

In some aspects, the subject matter described in this specification may be embodied in methods that may include the actions of providing training data to a neural network that includes an output layer and one or more hidden layers, each of the hidden layers comprising multiple nodes and corresponding parameters, calculating a gradient for the neural network by applying a cost function output layer activation function to the output layer, where the cost function output layer activation function is dependent on the training data and parameters, and training the neural network using the gradient to predict a value that represents a rental cost of a unit type in a particular area represented by input data received by the neural network, where training the neural network using the gradient includes using the gradient to update the parameters.

Other implementations of this and other aspects include corresponding systems, apparatus, and computer programs, configured to perform the actions of the methods, encoded on computer storage devices. A system of one or more computers can be so configured by virtue of software, firmware, hardware, or a combination of them installed on the system that in operation cause the system to perform the actions. One or more computer programs can be so configured by virtue of having instructions that, when executed by data processing apparatus, cause the apparatus to perform the actions.

The details of one or more implementations are set forth in the accompanying drawings and the description below. Other potential features and advantages will become apparent from the description, the drawings, and the claims.

Other implementations of these aspects include corresponding systems, apparatus and computer programs, configured to perform the actions of the methods, encoded on computer storage devices.

BRIEF DESCRIPTION OF THE DRAWINGS

Like reference symbols in the various drawings indicate like elements.

DETAILED DESCRIPTION

Figure 1:
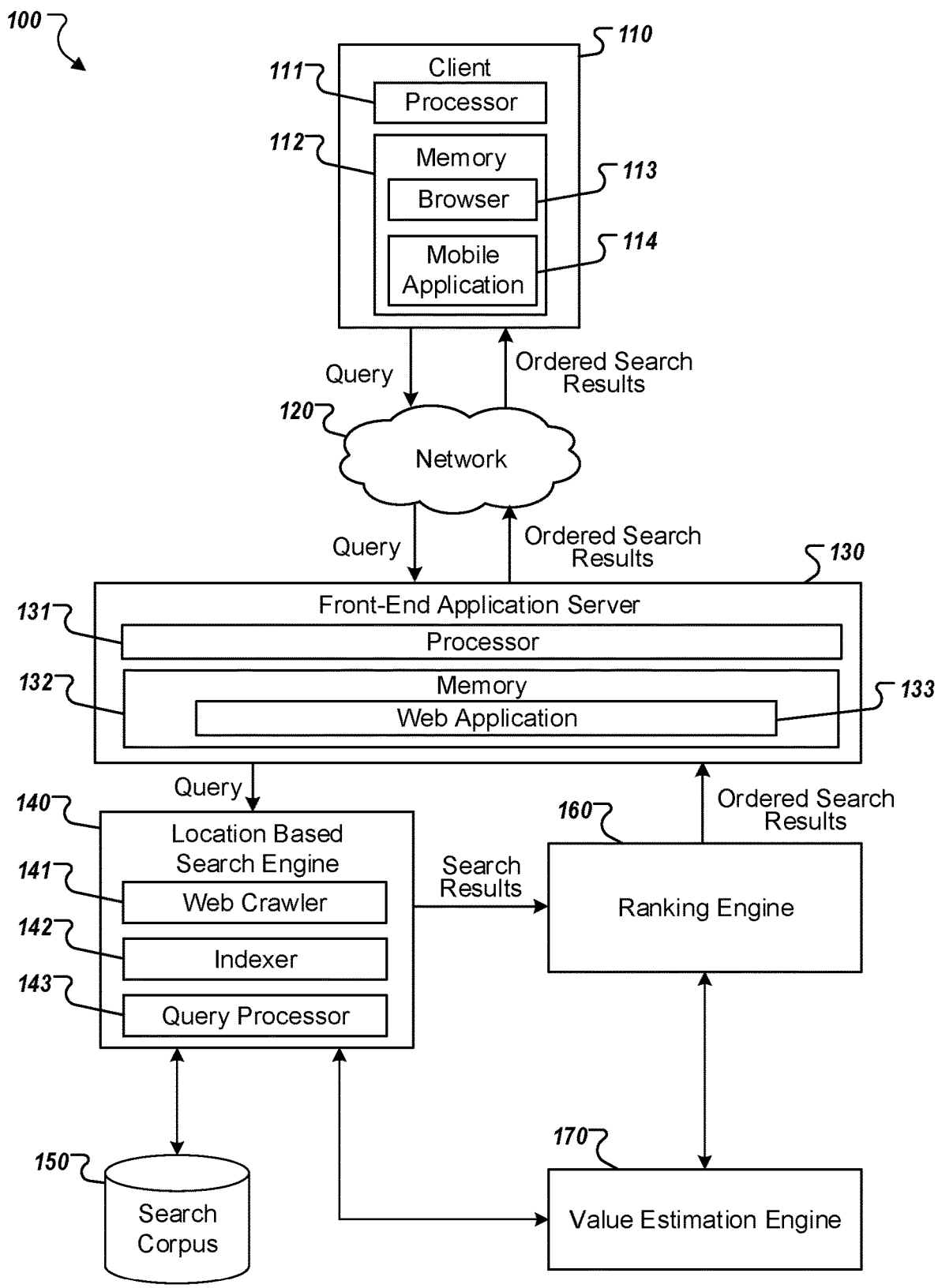
FIG. 1 illustrates an example search engine system for estimating the value of one or more properties that are associated with one or more identified resources.

FIG. 1 depicts an example search engine system 100 for enhancing point of interest identification, according to one example implementation. The system 100 may include a client device 110, a network 120, a front-end application server 130, a location based search engine 140, a search corpus database 150, a ranking engine 160, and a value estimation engine 170.

Client device 110 may be representative of one, or multiple, client devices. The client device 110 may include a mobile computing platform or a non-mobile computing platform. Mobile computing platforms may include, for example, a smartphone, tablet, laptop computer, or other thin client devices. Non-mobile computing platforms may include, for example, desktop computers, set top box entertainment systems, video game consoles, or the like. Client device 110 may be configured to communicate with front-end application server 130 via network 120 using one or more communication protocols.

The client device 110 of system 100 may include at least a processor 111 and a memory 112. The memory 112 may provide for the storage of computer program code associated with one or more applications installed on client 110. The applications may include, for example, a browser 113 or mobile application 114. Processor 111 may be configured to execute the stored computer program code in a manner that allows client 110 to realize the functionality provided by the applications. Processor 111 may also be configured to execute instructions to realize the functionality associated with any of the actions attributed to client 110 below.

The client 110 may be able to access one or more web based applications 133 hosted by front-end application server 130 via network 120 using browser 113. Such web based applications may include, for example, an application that facilitates identification of resources that include information for one or more properties/units or other entities that may be available for sale, for lease, or that provide a particular service. An entity may include any item that may be available for sale or lease such as, for example, a book, a clothing item, a motor vehicle, a consumer electronic item, a house, an apartment, or the like. Alternatively, an entity may include a party that provides a service such as, for example, a restaurant, a barber shop, a day care facility, a school, a doctor's office, a law office, a government agency, or the like. Web application 133 may utilize one or more back-end components in order to identify one or more resources that include information for one or more entities based on search input parameters. In certain instances, web application 133 may utilize the methods set forth herein to identify a set of one or more resources that are responsive to a query and include listing information for one or more properties, or information for one or more other entities.

Identification of resources may be achieved by using client device 110 to search one or more databases such as, for example, search corpus database 150 and then using one or more back-end components to identify and return ordered search results to client device 110. In some examples, the returned search results include graphical and/or textual representations of corresponding resources and the information included in the corresponding resources. A user may initiate a search with client device 110 by interacting with one or more search fields provided by web application 133 via a browser 113. For instance, a user may provide an input into a search field that can be used as at least a portion of a search query. Then, the user may instruct the client device 110 to transmit the search query to front-end application server 130 via network 120.

Alternatively, or in addition, a user may input a search query by drawing one or shapes around a location of interest on a map provided by a graphical user interface. Client device 110 may then generate a query to identify resources that include listing information for one or more properties that may reside within geographic locations associated with the one or more shapes drawn by the user on the map provided by a graphical user interface, and transmit the query to front-end application server 130. The front-end application server 130 may then forward the query to one or more back-end data processing systems that may execute the search query. The backend system may identify a set of search results in response to the search query, such as a set of resources that include listing information for one or more properties, rank each search result in the set of search results, and then return the set of search results that are responsive to the received query to the front-end application server 130. The front-end application server 130 may then forward the search results back to client device 110.

The search results may be displayed on a graphical user interface associated with client device 110 in a variety of different ways that may assist a user in understanding and interpreting the search results. For instance, representations of the search results may be displayed as a list, where each representation in the list is ordered according to a rank determined by one or more backend components of system 100 such as, for example, ranking engine 160. Alternatively or additionally, the search results may be represented as graphical icons that are plotted on a map of a geographical area and each correspond to a particular resource identified as a search result that is responsive to a received search query. The location of each graphical icon on the map may be indicative of the location of one or more properties for which the corresponding resource includes listing information. In certain instances, search results may be displayed as both a ranked list in a first portion of the graphical user interface and as a plot of graphical icons on a map in a second portion of the graphical user interface. Other ways of displaying search results also fall within the scope of this specification.

Separate from browser 113, a client device 110 may also be able to use a mobile application 114 in order for a user of client device 110 to avail himself of the same, or similar, functionality that was described above as being provided by a web application 133 via browser 113. Mobile application 114 may include an executable software program that was previously downloaded from a mobile application provider. Mobile application 114 may be configured to relay commands input by a user such as, for example, search queries to the front-end application server 130. After receiving a search query from mobile application 114, the front-end application server 130 may request that one or more backend components execute the search query, rank the search results, and then return the ranked search results to mobile application 114, which may display the search results as a ranked list of resources that each include listing information for one or more properties, as plotted graphical icons on a map, or a combination thereof.

Network 120 may be configured to facilitate connectivity between a client device 110 and the front-end application server 130. Client 110 and front-end application server 130 may be connected to network 120 via one or more wired, or wireless, communication links. Network 120 may include any combination of one or more types of public and/or private networks including but not limited to a local area network (LAN), wide area network (WAN), the Internet, a cellular data network, or any combination thereof.

Front-end application server 130 may include at least a processor 131 and a memory 132. The memory 132 may provide for the storage of computer program code associated with one or more applications hosted by front-end application server 130. The applications may include, for example, a web application 133 that may facilitate identification of resources that include listing information for one or more particular properties that may be available for sale, for lease, or that provide a particular service. Processor 131 may be configured to execute the stored computer program code in a manner that allows front-end application server 130 to realize the functionality provided by the applications. Processor 131 may also be configured to execute instructions to realize the functionality associated with any of the actions attributed to front-end application server 130 below.

Front-end application server 130 may serve as an interface between the client 110 and the back-end components of system 100 that may include, for example, a location based search engine 140, search corpus database 150, ranking engine 160, and value estimation engine 170. Front-end application server 130 may be comprised of one or more server computers. Front-end application server 130 may be configured to receive commands from a client device 110, and translate those commands, if necessary, into a format that is compatible with one or more back-end network components. Front-end application server 130 may also employ network security applications such as, for example, a firewall, user authentication, subscription verification, or the like in an effort to supervise access to one or more back-end network components, if necessary.

Front-end application server 130 may also facilitate session management for each browsing session initiated by each respective client device 110 that is currently using a browser 113, or mobile application 114, to avail itself of the services provided by the web application 133. For instance, front-end application server 130 may employ functionality to associate an identifier with each query received by the front-end application server 130 from a particular client 110. The front-end application server 130 may later utilize the identifier in order to associate ordered search results received from a ranking engine 160 with a query received from a particular client 110. The identifier may then be used to return the set of ordered search results to the client device 110 that initiated the query. The identifier may include a user identifier, device identifier, transaction identifier, or the like.

System 100 may also include a location based search engine 140. Location based search engine 140 may be configured to receive and execute search queries that are associated with a location component. The location component of the search query may be based on a particular location that was input by a user via client device 110. The location component may be the location of the particular client device 110, or some other location that the user of client device 110 has input as a search parameter. Alternatively, the location component of the search query may be obtained by front-end application server 130, a back-end network component, or another network component associated with system 100 based on one or more attributes associated with a client device 110. For instance, one of the aforementioned network components may determine the current location of a client device 110. Alternatively, the current location of a client device 110 may be provided to one or more network components of system 100 by a third party. Alternatively, the location component may be determined based on locations that the client device 110 has recently traveled. The location component may include, for example, a neighborhood, a city, a state, a zip code, GPS coordinates, longitude and latitude coordinates, or the like.

Location based search engine 140 may include a web crawler 141, an indexer 142, and a query processor 143. The location based search engine 140 may be hosted by one or multiple server computers. The server computer(s) hosting the location based search engine 140 may be the same server computer(s) that provide the front-end application server 130. Alternatively, however, the server computer(s) hosting the location based search engine 140 may be a different set of one or more server computer(s) that are configured to communicate with the front-end application server 130 via one or more public or private networks.

Web crawler 141 may be configured to traverse computers connected to a computer network such as, for example, the Internet, to scan and identify data associated with particular properties. For instance, web crawler 141 may scan computers associated with a computer network in order to identify resources such as web pages and other files accessible via the computer network that may include data associated with one or multiple properties that are currently being offered for sale or lease. Alternatively, or in addition, web crawler 141 may scan computers associated with a computer network in order to identify resources that may include data associated with one or more services. The identified resources or a subset of the raw data associated therewith may be stored in search corpus database 150.

In some implementations, web crawler 141 may be autonomous software that is configured to periodically scan computer networks in order to identify new, or previously undiscovered, web pages, network accessible files, or other resources associated with one or more properties that are currently being offered for sale, for lease, or resources associated with one or more services. Alternatively, or in addition, the functionality of web crawler 141 may be performed by one or more operators of location based search engine 140. For instance, a group of one or more analysts may obtain raw data associated with a property, and store the raw data in search corpus database 150. Alternatively, or in addition, it is contemplated that a party that offers a property for sale, for lease, or that provides a service may also upload raw data associated with the property to search corpus database 150.

The aggregated set of raw data stored in search corpus database 150 may comprise a wealth of data describing a wide spectrum of different properties. For instance, search corpus database 150 may include for each known property, for example, the name of the property, the property's location, a description of the property, a value associated with the property, or the like. The value for the property may include, for example, the price of a property that is being offered for sale or for lease. Alternatively, however, the value for a property may include, for example, a property rating. Other types of raw data associated with a property may be obtained via the data crawling process and stored in search corpus database 150.

In some examples, the system 100 further includes a resource management console (not shown), through which a variety of third parties may manage one or more resources or other information contained in search corpus database 150. Third parties, such as property managers, landlords, property owners, and real estate agents may access one or more resources that are associated with the respective third party's account. In this way, such third parties may be able to post and manage listing information for various properties that are searchable to users. A third party may, for instance, initially register an account through interaction with the resource management console, and later access their account to, for example, add a new listing information for properties that properties that are currently available or will become available in the near future, remove listing information for properties that have been taken off the market, update listing information for properties, and the like.

Third parties may use any of a variety of client devices to interact with resource management console and search corpus database 150. Such third party client devices may function in a manner similar to that of client 110, and may communicate with resource management console over network 120 or one or more networks that are similar to that of network 120. In some examples, such third parties may manage resources for properties on any of a number of scales. For instance, a property management company may manage a web page for a particular apartment building or community, and may further manage elements or sub-pages of this web page for apartments or units within the particular apartment building or community. In some examples, the resource management console may provide such third parties with access to one or more tools that leverage the value estimation engine 170, as described in further detail below.

Indexer 142 may be configured to analyze the raw data obtained during the crawling process in order to make the raw data searchable. For instance, indexer 142 parse the raw data and extract one or more types of relevant data. For example, the indexer 142 may analyze the raw data to extract a property's name, a property's location, and a value associated with the property. Indexer 142 may than associate the extracted data with one or more keywords. The associated keywords may be compared to aspects of received search queries in order to determine whether the extracted data associated with the keywords is responsive to the search query.

Query processor 143 may be configured to receive a search query from front-end application server 130 that originated at a client device 110. Query processor 143 may be configured to parse the received query, extract any relevant keyword(s) from the received query, and then execute the query against the index generated by indexer 142. Query processor 143 may alter the form of one or aspects of the received query. For instance, query processor 143 may alter one or more keywords in order to expand or narrow the scope of a received query, as necessary. Such alterations to keywords of a query may include, for example, utilizing a root expander, replacing one or more characters with a wildcard character, insertion of one or more Boolean operators between keywords, dynamically altering location information associated with the query, or the like.

Query processor 143 may also translate one or more aspects of the received query in order to make the query compatible with the index that is associated with the search corpus database 150. Query processor 143 may then execute the query against the search corpus database 150. Execution of the search query against the search corpus 150 may yield a set of one or multiple search results. The search results may identify, for example, a group of one or multiple links that are associated with resources that are responsive to the query received from client 110. The search result links may reference a resource that includes information associated with one or more properties. For instance, the search result links may reference web pages that include listing information for one or more properties. The information included in each resource may be drawn from search corpus database 150.

The set of search results may be substantially unordered, or otherwise arranged in an order that is not based on entity value. The search results identified by the query processor 143 in response to the received search query may then be passed to the ranking engine 160. In some implementations, additional information for each resource may also be passed to ranking engine 160 by location based search engine 140, such as data indicating the amount of time that has elapsed since each resource was last updated, the availability of one or more properties for which the particular resource includes listing information, the interface through which the particular resource's listing information is supplied and/or modified, the value by which one or more properties associated with the listing information of the particular resource exceed the maximum desired value, various verifications associated with the particular resource and properties, or a combination thereof. The location based search engine 140 may communicate with the ranking engine using one or more public or private networks.

System 100 may also include a ranking engine 160. Ranking engine 160 may be hosted by one or multiple server computers. The server computer(s) hosting the ranking engine 160 may be the same server computer(s) that provide the front application server 130. Alternatively, however, the server computer(s) hosting the location based ranking engine 160 may be a different set of one or more server computer(s) that are configured to communicate with the front-end application server 130 via one or more public or private networks.

Ranking engine 160 may be configured to perform a series of post processing operations on the set of identified search results. The post processing operations may determine a ranking score that may be associated with each resource in the set of search resources based at least on the analysis of a metric associated with each entity responsive to a query. For instance, a ranking score may be determined for a particular resource based on the amount of time that has elapsed since the particular resource has been updated, the availability of one or more properties for which the particular resource includes listing information, the interface through which the particular resource's listing information is supplied and/or modified, the value by which one or more properties associated with the listing information of the particular resource exceed the maximum desired value, various verifications associated with the particular resource and properties, or a combination thereof.

Ranking engine 160 may make such determinations based on information provided by location based search engine 140, information included in search corpus 150, historical information that is managed or accessed by ranking engine 160, and the like. Ranking engine 160 may then return the set of ordered results to the front-end application server 130 via one or more public or private networks. Front-end application server may then provide the ordered search results to client device 110 via network 120.

Ranking engine 160 may be configured to isolate and analyze search results based on a predetermined geographic region. A geographic region may include, for example, a neighborhood, a city, a state, a zip code, GPS coordinates, longitude and latitude coordinates, a shape drawn by a user on a graphical user interface map, or the like. Once a set of search results are isolated by geographic region, the ranking engine may analyze characteristics each resource and the one or more properties for which each resource includes listing information.

For instance, the ranking engine 160 may determine how much time has elapsed since the particular resource was last updated, whether one or more properties for which the particular resource includes listing information are currently available or will become available within an upcoming timeframe, whether the information included in the particular resource is supplied manually through a user interface or automatically through an application programming interface, whether one or more properties for which the particular resource includes listing information have prices that exceed a specified price range, whether any attributes of the particular resource or one or more properties associated with the particular resource, and the like. Ranking engine 160 may utilize make such determinations based on information provided by location based search engine 140, information included in search corpus 150, historical information that is managed or accessed by ranking engine 160, and the like. Ranking engine 160 may assign a score to each resource identified as responsive a given search query.

Ranking engine 160 may be configured to make one or more determinations about a particular resource and assign a ranking score based on such determinations, as appropriate. The ranking engine 160 may rank a set of resources based on the ranking score assigned to each resource in the set of resources. In some examples, the ranking engine 160 may, before making one or more of such determinations, determine a ranking score for a particular resource based on default criteria, e.g., a distance to a desired location or an extent of a match between the resource and certain user input search criteria, and, after making one or more determinations, adjusting the ranking score for the particular resource based on one or more of such determinations. In some implementations, such ranking scores may be weighted scores, where results of each determination carry a respective weight. For instance, there may be situations in which it is beneficial to assign ranking scores in a manner that favors resources that include information that has been recently updated over resources that include information that has less recently been updated. In this way, users may be presented with listing information that is known to be relatively fresh and up-to-date, which may be especially important in competitive rental markets.

In some aspects of the present disclosure, ranking engine 160 may be utilized only when requested by a user of client device 110. If a user decides to not use ranking engine 160, the search results may be provided to the client device in the order determined by location search engine 140. Such order may be, for example, based on most expensive price, lowest price, based on an analysis of keyword frequency in a web page associated with the search result corresponding to the entity, based on payments received to increase a ranking score associated with each entity, or the like, or any combination thereof. Accordingly, client 110 may be able to toggle ranking engine 160 on and off. In some instances, client 110 may be able to adjust ranking engine 160 such that ranking scores are assigned based on specific characteristics of resources.

System 100 may also include a value estimation engine 170. Value estimation engine 170 may be hosted by one or multiple server computers. The server computer(s) hosting the value estimation engine 170 may be the same server computer(s) that provide the front application server 130. Alternatively, however, the server computer(s) hosting the value estimation engine 170 may be a different set of one or more server computer(s) that are configured to communicate with the front-end application server 130 via one or more public or private networks.

The value estimation engine 170 may be configured to estimate one or more values of properties for which each of one or more resources include listing information. Such one or more resources may, for instance, include those that indicate one or more features of such properties, but not do not specifically indicate the value of such properties. An example of such a resource may, for instance, include a resource including listing information for a particular apartment that indicates that the particular apartment is located at a particular geographic location and has a specific number of bedrooms and bathrooms, but does not indicate the rental price of the particular apartment. Resources that lack details on property value may, for example, include resources that are managed by entities that have either intentionally or unintentionally omitted such details the resource's listing information, resources that include listing information for properties that have yet to officially become available for tenancy or occupancy, and the like.

In this way, the value estimation engine 170 may obtain estimated values of properties within a community of properties, such as a building, when values are only known for certain types of property. For instance, the value estimation engine 170 may obtain estimates for the rental price of Studio apartments or 2-Bedroom 3-Bathroom units in a particular building, even if the only rental prices that are known for the particular building are rental prices of 1-Bedroom 1-Bathroom units and 2-Bedroom 2-Bathroom units within the particular building.

The basic assumption under which such estimations are obtained is that the different unit types are linearly related to each other. Under this assumption, the value estimation engine 170 may generate a vector of coefficients that could be multiplied by the rent of any one unit type to produce the rents for all the unit types. In practice, because there may not be a single unit type for which the rent in every building or other community is known, the value estimation engine 170 may derive the values for such units from the rental values that are available, and multiply the derived values by a vector to estimate the missing or stale rental values.

This vector has been found to be fairly constant for buildings or other communities that are geographically close and have similar characteristics. For at least this reason, the value estimation engine 170 may, in some implementations, calculate a different set of coefficients for every submarket-class combination. The value estimation engine 170 may, in some examples, calculate one parameter or coefficient for each type of unit that is included in a given group of communities. For instance, in an example in which the different types of units included in a given group of apartment buildings correspond to units that have different combinations of quantities of bedrooms and quantities of bathrooms.

For example, if each unit in a given group of apartment buildings has some combination of 0-4 bedrooms and 1-3 bathrooms, then the value estimation engine 170 may calculate fifteen different parameters, $C=c_1, c_2, \ldots c_m$, such that there is one parameter for each combination of 0-4 bedrooms and 1-3 bathrooms. In this example, the resources accessible to the value estimation engine 170 may include listing information for a building b in the given group of apartment buildings that indicates some combination of known rental prices, $x_{b,1}, x_{b,2} \ldots x_{b,15}$. Following this example, the value estimation engine 170 may obtain a mean value, $\mu_b$, for building b in the given group of apartment buildings, given by:

$$\mu_b = \text{mean}\left(\frac{x_{b,1}}{c_1}, \frac{x_{b,2}}{c_2}, \ldots, \frac{x_{b,15}}{c_{15}}\right) \quad (1)$$

In this way, the value estimation engine 170 may obtain such a mean value, $\mu_b$, for building b in the given group of apartment buildings using only the x-values that are indicated in information of resources that are accessible to system 100. Upon determining $\mu_b$, the value estimation engine 170 may obtain an estimated value for particular units for which the resources accessible to system 100 do not include information that indicate x-values or other relevant value information. For example, the value estimation engine 170 may obtain an estimated value for a unit of type n in building b, estimate$_{b,n}$, given by:

$$\text{estimate}_{b,n} = \mu_b * c_n \quad (2)$$

It can be seen that the value estimation engine 170 may utilize the parameters C, as calculated for a given group of apartment buildings, to obtain estimates for all missing or stale x-values. To actually calculate the parameters C, the value estimation engine 170 may obtain a naïve estimate of the value of each unit in a given group of apartment buildings or communities, and then apply gradient descent to a cost function to find an optimal solution. The cost function, which may be defined by the value estimation engine 170, may be given by:

$$J(C, G) = \frac{1}{m} \sum_{(b,i) \in G} (x_{b,i} - \text{estimate}_{b,i})^2 \quad (3)$$

In this example, C represents the set of parameters, G represents the given group of buildings or communities, b represents an index for each building included in the given group of buildings, i represents an index for each of the different types of units in the given group of buildings, m represents the quantity of known x-values, $x_{b,i}$ represents a known value of a unit of type i that is physically located within building b, and estimate$_{b,i}$ represents an estimate of the value of the unit of type i that is physically located within building b and is dependent on the set of parameters C. In applying gradient descent to such a cost function, the value estimation engine 170 may vary the values of each parameter included in the set of parameters C such that the cost J may be minimized. In this way, the value estimation engine 170 may arrive at final value estimations that are as close as possible, in value, to the true values of $x_i$. Once the value estimation engine 170 has executed a sufficient number of cost function optimization iterations, the value estimation engine 170 may obtain an optimal set of the parameters C, which it may then utilize to calculate a mean value, $\mu_b$, for each building in the given group of buildings and thus obtain estimated values for each unit in the given group of buildings.

Thus, the cost function may measure how closely a set of coefficients estimates the data. While the initial random estimate may not be as accurate as desired, applying gradient descent minimizes the error and determines the coefficients that are the best predictors. In this way, the process allows users to make predictions or estimate values for any building based on the most granular, comparable set possible, depending on the sample size. For example, the set of coefficients can predict or estimate the rent of any unit within a building based on the rents of the other units in that building. Such estimates include rents for units for which no data is available as well as making more accurate comparisons between rents for buildings with different unit mixes (e.g., buildings with primarily two-bedroom units and buildings with primarily one-bedroom units, or the like)

As mentioned above, the given group of buildings or communities G may be selected on the basis of geographical location. In some examples, the given group of buildings or communities G may be selected on the basis of one or more additional or alternative factors such as user rating or other building quality metrics. Each building or community, b, may represent a group of units or other properties that are structurally coupled or geographically proximate to one another. As such, each building or community, b, may, for example, correspond to an apartment complex, a condominium building, a neighborhood, a row of townhouses, an office building, and the like.

System 100 and its users may leverage value estimates that are produced by the value estimation engine 170 in a variety of ways. For example, the ranking engine 160 may have access to such estimates and may rank search results or augment search results with indicia on the basis thereof. Examples of such techniques are described in the description of FIG. 2 below. In some implementations, one or more third parties, such as those described above in the description of the resource management console of system 100, may have interact with one or more tools that leverage the value estimation engine 170. For example, the value estimation techniques described herein may be leveraged to provide property managers and other entities with suggested rental values for their respective properties. Such suggestions may, for instance, be provided to these third parties in real-time as listing information is being entered or as a separate tool. In some implementations, third parties may elect to have system 100 automatically provide prices for their listed properties. In this way, system 100 may streamline aspects of the property listing process for the entities that manage them. As mentioned above, the property value estimation techniques described herein may be also be leveraged to, for example, provide entities with analytics on pricing schemes being used by competitors.

Figure 2A:
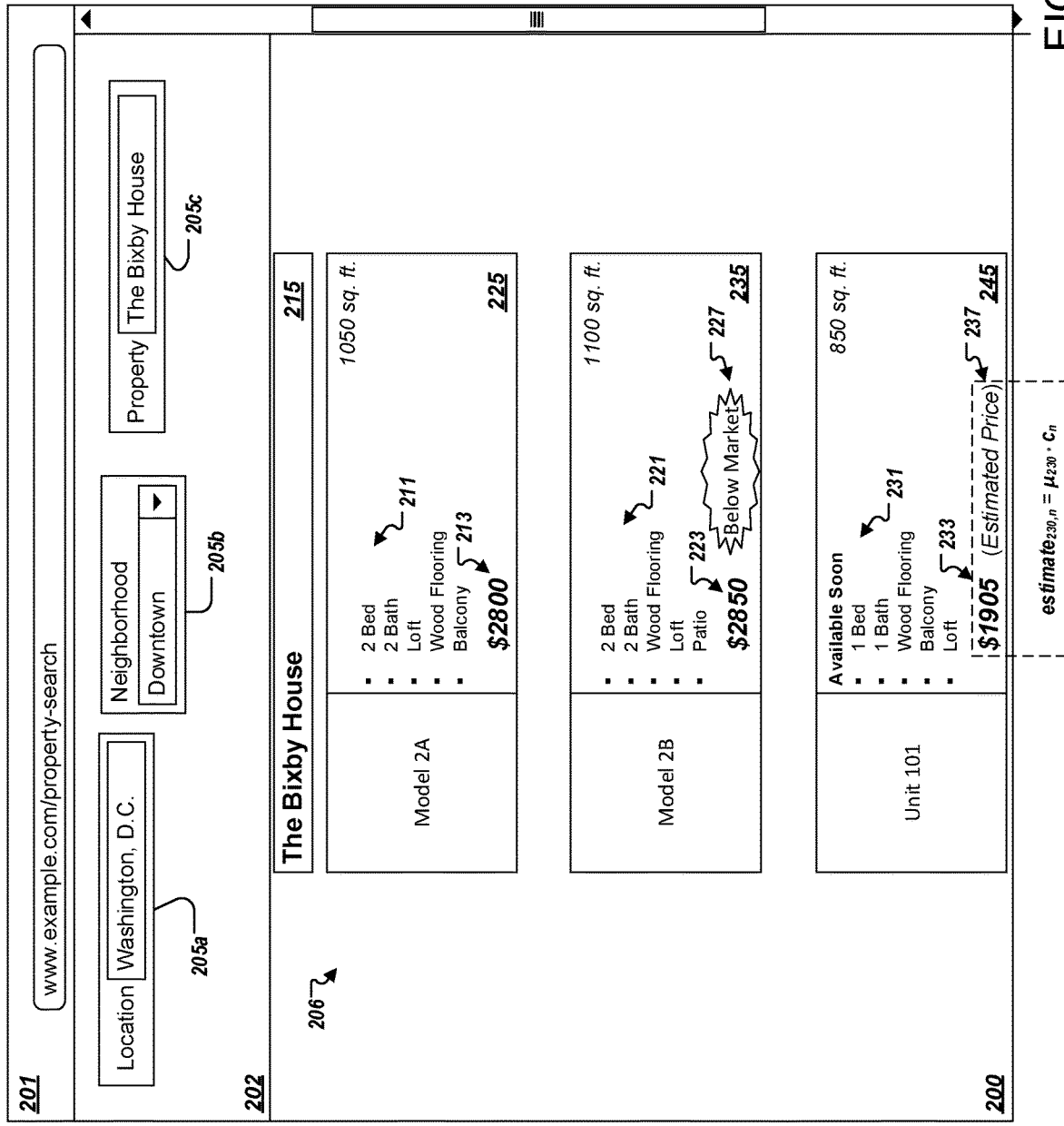
FIG. 2A illustrates an example graphical user interface for displaying one or more search results that include graphical or textual elements having been generated based on estimated values of one or more properties.

FIG. 2A illustrates an example graphical user interface 200 for displaying one or more search results that include graphical or textual elements having been generated based on estimated values of one or more properties. The graphical user interface 200 may be accessed through an application 201, such as a browser or other application running on a personal or mobile computing device, such as browser 113, or through an application 114 running on client device 110, and may represent a page or screen provided in association with an online or application-based real estate marketplace, directory, or search engine. For example, the graphical user interface 200 may represent a webpage of a property analysis interface showing results returned in response to a user-submitted search query. The graphical user interface 200 may include a search query interface 202 and a listing of one or more search results 206. Briefly, as described in more detail below, the search query interface 202 may receive one or more search parameters from a user that may be utilized to generate search queries, while the listing of search results 206 may present various representations of the search results that are identified responsive to generated search queries. At least a portion of such representations may include graphical or textual elements having been generated based on estimated values obtained using the techniques described herein.

In this example, the search query interface 202 includes a general location field 205a that allows users to specify a desired geographic region on a city, state, or zip-code scale, a neighborhood field 205b that allows users to specify a desired area or neighborhood within the location, and a property field 205c that allows users to specify a desired property name, if known. In addition, the search query interface 202 of FIG. 2A may include additional fields or checkboxes that allow users to indicate whether or not certain features or attributes are desired to be included in the query. In some implementations, the search query interface 202 may include only a portion of the fields depicted. In some examples, the search query interface 202 may alternatively or additionally include fields that allow users to specify desired property prices or price range, desired unit prices, desired property size, desired unit size, desired year built or updated, desired quantities of in-unit washing machines, dryers, dishwashers, heating systems, air conditioning systems, refrigerators, ovens, ranges, and the like. In some examples, the search query interface 202 may include additional drop-down menus and other fields that receive open-ended textual input, data indicating one or more user preferences or selections, or a combination thereof.

It can be seen that fields 205a-205c each receive user input, which may be in the form of textual input, a selection from a drop-down menu, or the like, or any combination thereof. Thus, the various fields are not limited to the implementations depicted in FIG. 2A.

In the example of FIG. 2A, a user has provided input to search query interface 202 that corresponds to desired location of Washington, D.C., desired neighborhood of Downtown, and desired property name of The Bixby House. The application running on the client device may generate a query based on the search parameters or criteria received through the search query interface 202, forward the query to front-end application server 130, and the search query may be executed by one or more back-end components of system 100, such as location search engine 140, ranking engine 160, and/or value estimation engine 170. Alternatively, any unstructured search criteria entered by a user via graphical user interface 200 may be transmitted to front-end application server 130, front-end application server 130 may then generate a search query based on the received search criteria, and then the search query may be executed by one or more back-end components of system 100 such as, location search engine 140. Then search results such as, for example, resources that include listing information for the properties, models, and/or units shown within listing 206 may be returned to client device 110, and presented through graphical user interface 200.

Representations of the initial set of search results may be displayed as a list of search results 206 that may include, for example, a representation 215 of a listing for the Bixby House, a representation 225 of a listing for Model 2A in the Bixby House, and a representation 235 of a listing for Model 2B in the Bixby House. That is, representations 215, 225, 235, and 245 correspond to listings for a property, unit models within that property, and particular units within the community, respectively, each of which may represent search results returned in response to a search query generated based on information provided to search query interface 202 for property listings within the geographic region of the District of Columbia. In this instance, the Bixby House, and its unit models and/or individual units, are returned responsive to the search parameters or criteria received through the search query interface 202. In some implementations, representations of search results, such as resources, may be presented within the list of search results 206 in an order that corresponds to rankings of the search results, such as those provided at least in part by ranking engine 160. Each representation included in the list of search results 206 may, for instance, include an image of the respective property, a textual overview of the details of the listing, one or more graphical or textual elements that indicate characteristics of the respective property or the resource that includes listing information for the respective property, and the like.

For instance, representation 215 may include text indicating the name of the property community to which one or more units or properties belongs, or "The Bixby House," an image of the Bixby House community from an aerial perspective, text 211 indicating one or more details of the property of type n that is located within the Bixby House, and text 213 indicating the monthly rental fee of the property of type n that is located within the Bixby House, or $2800. In addition, each representation may also include one or more indications of characteristics of the respective community, individual properties or unit models within the respective community, and the resource that includes listing information for one or more properties or unit models within the respective community.

In some examples, each of representations 215-245 may include one or more graphical or textual elements that indicate one or more characteristics of the price or other value as displayed. Such elements may be generated based on current and/or historical estimated values of properties, such as those which are obtained by value estimation engine 170 as described above in reference to FIG. 1. For example, representations 235 and 245 are shown as including some of such graphical and/or textual elements.

In the example of FIG. 2A, representation 235 includes an element 227 indicating that the rental price of a Model 2B unit within the Bixby House community, which is $2850 per month as indicated by text 223, is indicated as being below market, i.e., below the average market price for a similar unit. Element 227 may have, for instance, been generated based on information produced by value estimation engine 170. For example, the value estimation engine 170 may have obtained an estimated rental value for the Model 2B unit type within the Bixby House community before the listing information for the Bixby House community that provided a known value of the unit was made accessible to the system 100. Once such listing information was made accessible to the system 100, for instance, after a third party has updated the listing information for the Model 2B unit type within the Bixby House community to include information that specifies the price at which that unit type is being made available for tenancy, the system 100 may determine that the actual value of such a unit is less than the estimated value by at least a threshold amount. That is, the system 100 may have determined that the Model 2B unit type within the Bixby House community is currently being listed at a price that is significantly less than estimated, and thus represents a below market price. In other words, the value estimation engine 170 may have obtained an estimate for the Model 2B unit type within the Bixby House community that was greater in value than $2850.

In some examples, the value estimation engine 170 may calculate one or more confidence scores that represent a level of confidence in one or more estimates obtained using the techniques described herein. In such examples, graphical or textual elements, such as element 227, may be generated further based on such confidence scores. In some implementations, the system 100 may generate a graphical or textual element that is similar to that of element 227, but serves to indicate that the price or value at which a property has been listed exceeds an estimate obtained by the value estimation engine 170.

Similarly, representation 245 includes an element 237 indicating that the price of a unit of type n within the Bixby House community, which is $1905 as indicated by text 233, is an estimated price. In this case, both elements 233 and 237 may have, for instance, been generated based on information produced by value estimation engine 170. It follows that, in this example, the system 100 may have had access to listing information for the unit of type n within the Bixby House community that indicated some characteristics of the unit, but not the rental price.

Since unit type n is, as mentioned above, just one of many different types of units that may exist within a given group of communities, the value estimation engine 170 may calculate a set of different parameters C, on the basis of which the value estimation engine 170 may obtain one or more of the estimated values described above in reference to the Bixby House community. In this example, the value estimation engine 170 may have also calculated a mean value for each of the communities in the neighborhood, and multiplied each mean value by the parameter, $c_n$, that corresponds to unit type n from among the set of parameters C to obtain such estimated values.

Figure 2B:
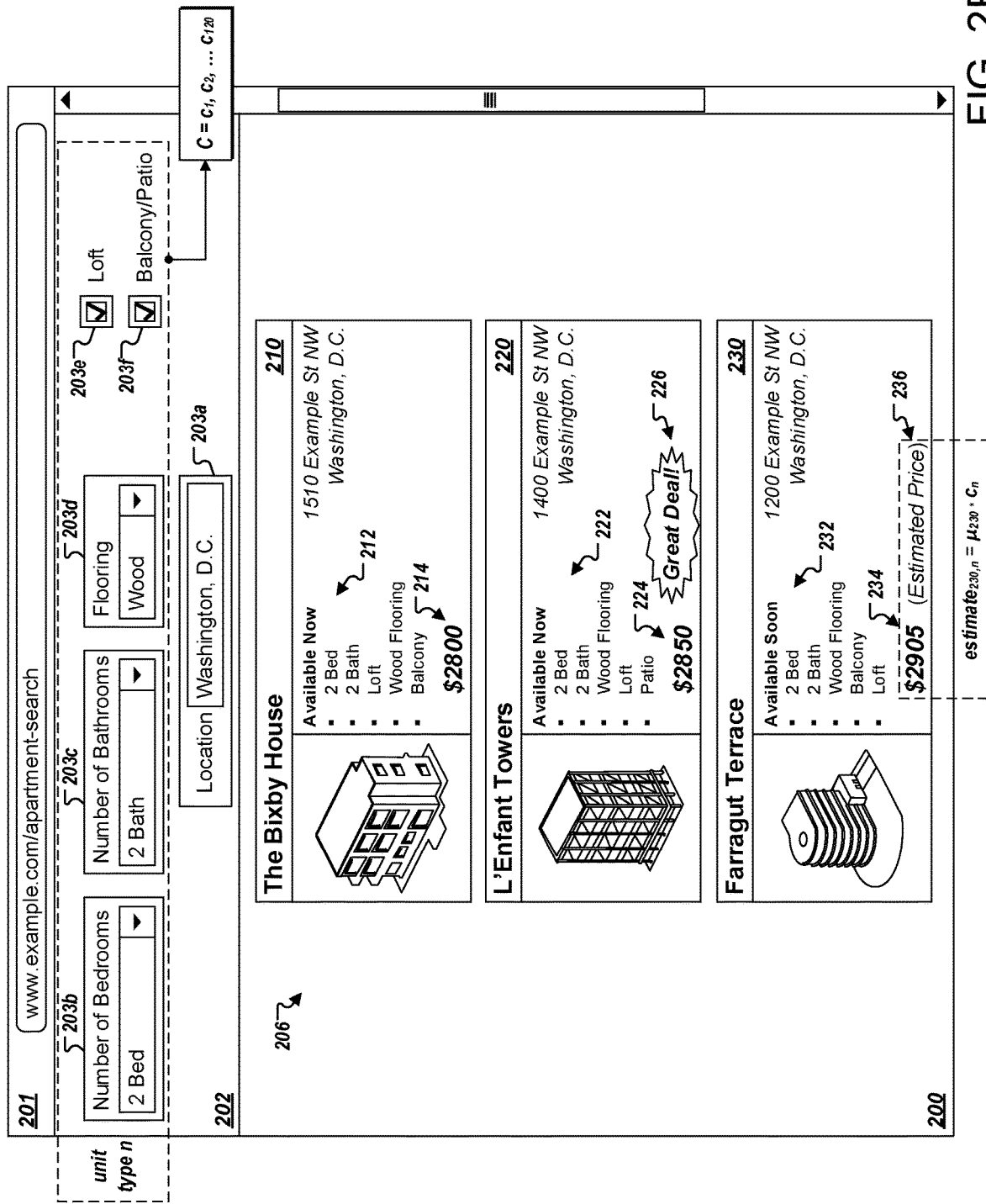
FIG. 2B illustrates an example graphical user interface for displaying a set of search results that include graphical or textual elements having been generated based on estimated values of one or more properties.

FIG. 2B illustrates an example graphical user interface 200 for displaying a set of search results that include graphical or textual elements having been generated based on estimated values of one or more properties. The graphical user interface 200 may be accessed through an application 201, such as a browser or other application running on a personal or mobile computing device, such as browser 113 or application 114 running on client device 110, and may represent a page or screen provided in association with an online real estate marketplace, directory, or search engine.

For example, the graphical user interface 200 may represent a webpage of an apartment-finding website showing results returned in response to a user-submitted search query. The graphical user interface 200 may include a search query interface 202 and a listing of search results 206. Briefly, as described in more detail below, the search query interface 202 may receive one or more search parameters from a user that may be utilized to generate search queries, while the listing of search results 206 may present various representations of the search results that are identified responsive to generated search queries. At least a portion of such representations may include graphical or textual elements having been generated based on estimated values obtained using the techniques described herein.

In this example, the search query interface 202 includes a general location field 203*a* that allows users to specify a desired geographic region on a city, state, or zip-code scale, a bedroom quantity field 203*b* that allows users to specify a desired number of bedrooms, a bathroom quantity field 203*c* that allows users to specify a desired number of bedrooms, and a flooring field 203*d* that allows users to specify a desired type of flooring. In addition, the search query interface 202 of FIG. 2 includes a fields or checkboxes 203*e* and 203*f* that allow users to indicate whether or not a loft is desired and indicate whether or not a balcony/patio is desired, respectively. In some implementations, the search query interface 202 may include only a portion of the fields depicted. In some examples, the search query interface 202 may alternatively or additionally include fields that allow users to specify desired unit prices, desired unit size, desired quantities of in-unit washing machines, dryers, dishwashers, heating systems, air conditioning systems, refrigerators, ovens, ranges, and the like. In some examples, the search query interface 202 may include additional drop-down menus and other fields that receive open-ended textual input, data indicating one or more user preferences or selections, or a combination thereof.

It can be seen that fields 203*b*-203*f* each receive user input that corresponds to unit characteristics. In this way, the input received through fields 203*b*-203*f* can be seen as that which specifies the type of desired unit. In an example in which field 203*b* allows users to select from among four different bedroom quantities (e.g., 0-4 bedrooms), field 203*c* allows users to select from among three different bathroom quantities (e.g., 1-3 bathrooms), field 203*d* allows users to select from among two different flooring options (e.g., wood or carpet), field or checkbox 203*e* allows users to select from among to different loft options (e.g., loft or no loft), and field or checkbox 203*f* allows users to select from two different balcony/patio options (e.g., balcony/patio or no balcony/patio), it can be seen that the search user interface 202 would allow users to select from among one-hundred and twenty different types of units.

In the example of FIG. 2, a user has provided input to search query interface 202 that corresponds to desired unit that has a two bedrooms, two bathrooms, wood floors, a loft, and a balcony/patio. For purposes of example, the type of unit that has been specified through search query interface 202 is type n, which represents just one out of one hundred and twenty different types of units that are enabled by fields 203*b*-203*f* and their various options. The application running on client device may generate a query based on the search parameters or criteria received through the search query interface 202, forward the query to front-end application server 130, and the search query may be executed by one or more back-end components of system 100, such as location search engine 140, ranking engine 160, and/or value estimation engine 170. Alternatively, any unstructured search criteria entered by a user via graphical user interface 200 may be transmitted to front-end application server 130, front-end application server 130 may then generate a search query based on the received search criteria, and then the search query may be executed by one or more back-end components of system 100 such as, location search engine 140. Then search results such as, for example, resources that include listing information for the apartments shown within listing 206 may be returned to client device 110, and presented through graphical user interface 200.

Representations of the initial set of search results may be displayed as a list of search results 206 that may include, for example, a representation 210 of a listing for the Bixby House, a representation 220 of a listing for L'Enfant Towers, and a representation 230 of a listing for Farragut Terrace. That is, representations 210-230 correspond to listings for one or more properties within the Bixby House, L'Enfant Towers, and Farragut Terrace communities, respectively, each of which may represent search results returned in response to a search query generated based on information provided to search query interface 202 for rental property listings within the geographic region of the District of Columbia. In this instance, the Bixby House, L'Enfant Towers, and Farragut Terrace communities each include units of type n, and are thus returned responsive to the search parameters or criteria received through the search query interface 202. In some implementations, representations of search results, such as resources, may be presented within list of search results 206 in an order that corresponds to rankings of the search results, such as those provided at least in part by ranking engine 160. Each representation included in the list of search results 206 may, for instance, include an image of the respective rental property, a textual overview of the details of the listing, one or more graphical or textual elements that indicate characteristics of the respective rental property or the resource that includes listing information for the respective property, and the like.

For instance, representation 210 may include text indicating the name of the community to which one or more rental properties belongs, or "The Bixby House," an image of the Bixby House community from an aerial perspective, text 212 indicating one or more details of the property of type n that is located within the Bixby House, and text 214 indicating the monthly rental fee of the property of type n that is located within the Bixby House, or $2800. In addition, each representation may also include one or more indications of characteristics of the respective community, individual properties within the respective community, and the resource that includes listing information for one or more properties within the respective community.

In some examples, each of representations 210-230 may include one or more graphical or textual elements that indicate one or more characteristics of the rental price or other value as displayed. Such elements may be generated based on current and/or historical estimated values of properties, such as those which are obtained by value estimation engine 170 as described above in reference to FIG. 1. For example, representations 220 and 230 are shown as including some of such graphical and/or textual elements.

In the example of FIG. 2, representation 220 includes an element 226 indicating that the rental price of a unit of type n within the L'Enfant Towers community, which is $2850 per month as indicated by text 224, can be seen as a relatively good deal. Element 226 may have, for instance, been generated based on information produced by value estimation engine 170. For example, the value estimation engine 170 may have obtained an estimated rental value for the unit of type n within the L'Enfant Towers community before the listing information for the L'Enfant Towers community that provided a known rental value of the unit was made accessible to the system 100. Once such listing information was made accessible to the system 100, for instance, after a third party has updated the listing information for the unit of type n within the L'Enfant Towers community to include information that specifies the rental price at which the unit of type n within the L'Enfant Towers community is being made available for tenancy, the system 100 may determine that the actual rental value of such a unit is less than the estimated rental value by at least a threshold amount. That is, the system 100 may have determined that the unit of type n within the L'Enfant Towers community is currently being listed at a rental price that is significantly less than estimated, and thus represents a bargain of sorts. In other words, the value estimation engine 170 may have obtained an estimate for the unit of type n within the L'Enfant Towers community that was greater in value that $2850 per month.

In some examples, the value estimation engine 170 may calculate one or more confidence scores that represent a level of confidence in one or more estimates obtained using the techniques described herein. In such examples, graphical or textual elements, such as element 226, may be generated further based on such confidence scores. In some implementations, the system 100 may generate a graphical or textual element that is similar to that of element 226, but serves to indicate that the price or value at which a property has been listed exceeds an estimate obtained by the value estimation engine 170.

Similarly, representation 230 includes an element 236 indicating that the rental price of a unit of type n within the L'Enfant Towers community, which is $2905 per month as indicated by text 234, is an estimated price. In this case, both elements 234 and 236 may have, for instance, been generated based on information produced by value estimation engine 170. It follows that, in this example, the system 100 may have had access to listing information for the unit of type n within the Farragut Terrace community that indicated some characteristics of the unit, but not the rental price.

Since unit type n is, as mentioned above, just one of one-hundred and twenty different types of units that may exist within a given group of communities, the value estimation engine 170 may calculate a set of one-hundred and twenty different parameters C, on the basis of which the value estimation engine 170 may obtain one or more of the estimated values described above in reference to the L'Enfant Towers and Farragut Terrace communities. In this example, the value estimation engine 170 may have also calculated a mean value for each of the L'Enfant Towers and Farragut Terrace communities, and multiplied each mean value by the parameter, $c_n$, that corresponds to unit type n from amount the set of parameters C to obtain such estimated values.

It is to be understood that search result representations provided by the techniques described herein may each include some or all of the types of elements described above. In some implementations, search result representations may only include elements that indicate information that is known to the search engine system 100.

In addition, one or more portions of each representation may serve as hyperlinks that point to other resources associated with the respective rental property listing. For example, representations 210-230 may further include one or more hyperlinks or other interactive components that direct users to a resource that includes the corresponding listing information, or other information related to the particular units or properties available for tenancy, the communities, the area surrounding the location of the particular units available for tenancy, and the like.

Alternatively, or in addition, the search results may be represented on a map (not shown) of the geographic location associated with the apartments. In some implementations, the map may include a graphical icon associated with the geographic location of each identified search result. In the example of FIG. 2B, the map may show topographical information for Washington, D.C., and more specifically the geographic region within which the Bixby House, L'Enfant Towers, and Farragut Terrace are located.

In some examples, representations of resources that are identified as responsive to search queries may be presented within list of search results 206 according their respective rankings. Each resource that is identified as responsive to a search query may, for instance, be ranked among the set of identified resources according to the ranking score provided by ranking engine 160 based on one or more determinations about the respective resource.

Figure 3:
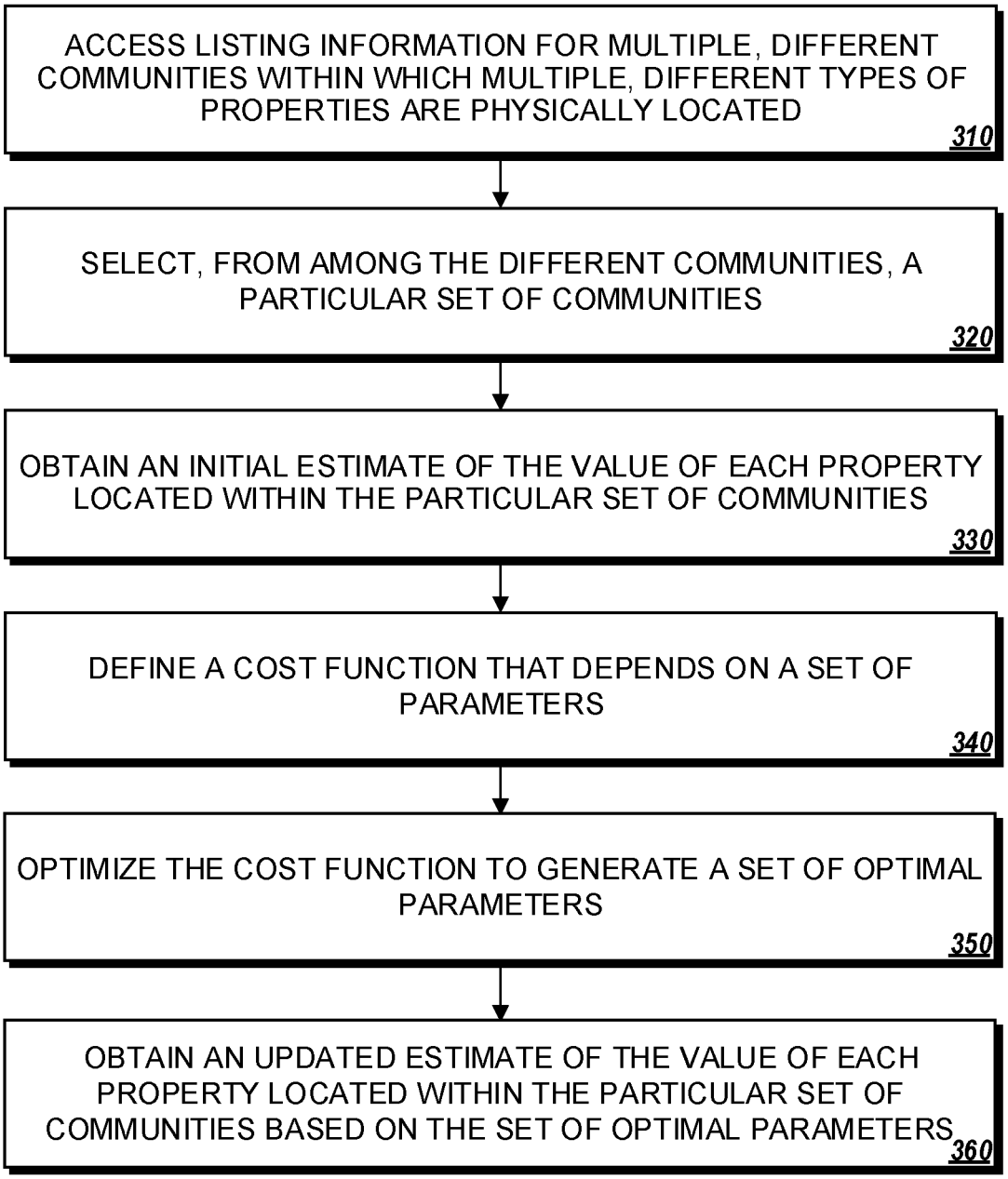
FIG. 3 is a flowchart of an exemplary process for estimating the value of one or more properties.

FIG. 3 illustrates exemplary process 300 for estimating the value of one or more properties. The following describes the process 300 as being performed by components of system 100 described above with reference to FIG. 1, such as value estimation engine 170, and in association with one or more components described above with reference to FIG. 2. However, the process 300 may be performed by other systems or system configurations. Briefly, the process 300 may include accessing listing information for multiple, different communities within which multiple, different types of properties are physically located (310), selecting, from among the different communities, a particular set of communities (320), obtaining an initial estimate of the value of each property that is physically located within the particular set of communities (330), defining a cost function that depends on a set of parameters (340), optimizing the cost function to generate a set of optimal parameters (350), and obtaining an updated estimate of the value of each property that is physically located within the particular set of communities based on the generated set of optimal parameters (360).

In more detail, process 300 may include accessing listing information for multiple, different communities within which multiple, different types of properties are physically located (310). This may, for instance, correspond to one or more components of system 100, such as location based search engine 140 and/or value estimation engine 170 as described above in reference to FIGS. 1-2, accessing listing information that is stored in search corpus 150. In some implementations, process 300 may further include obtaining a set of resources that each include listing information for a different communities within which one or more properties are physically located. In such implementations, accessing listing information for multiple, different communities within which multiple, different types of properties are physically located may include accessing the listing information that is included in the set of resources. In some examples, accessing listing information for multiple, different communities within which multiple, different types of properties are physically located may include accessing listing information for multiple, different buildings within which multiple, different types of units are physically located.

The process 300 may include selecting, from among the different communities, a particular set of communities within which multiple, different properties are physically located, where the multiple, different properties that are physically located within the particular set of communities represent a particular quantity of different types of properties (320). For example, this may correspond to one or more components of system 100, as described above in reference to FIGS. 1-2, selecting a group of two or more buildings or other communities that are considered to exhibit relatively similar pricing patterns, and may thus enable the value estimation engine 170 to obtain relatively accurate value estimates for the units included in the group of two or more buildings or communities. In the example of FIG. 2, such a particular set of communities may, for instance, include the Bixby House, L'Enfant Towers, and Farragut Towers communities.

The process 300 may include obtaining an initial estimate of the value of each property that is physically located within the particular set of communities (330). This may, for instance, correspond to one or more components of system 100, such as value estimation engine 170 as described above in reference to FIGS. 1-2, obtaining an estimate of the value of each of one or more of properties/units. Such initial estimates may, for example, be obtained for each and every property included in the particular set of communities, regardless of whether or not the listing information available for such properties indicates the property's value, and may be leveraged by the value estimation engine 170 to derive a set of parameters, such as the set of parameters C as described above in reference to FIGS. 1-2.

The process 300 may include defining a cost function that depends on a set of parameters, where the set of parameters (i) include one parameter for each type of property included in the particular quantity of different types of properties, and (ii) have values that are initialized based on the initial estimates of values of the properties (340). For example, this may correspond to one or more components of system 100, such as value estimation engine 170, defining a cost function, such as that which has been defined above by Equation 3, and depends upon a set of parameters. The quantity of parameters that are included in the set of parameters may be equal to the quantity of different types of properties that are included in the particular set of communities. In the example of FIG. 2, such a set of parameters may correspond to the set of parameters, C, that includes one-hundred and twenty different parameters. The initial values of such parameters, which may serve as a starting point from which one or more optimizing methods may be applied to the cost function, may be determined based on initial estimated values obtained by the value estimation engine 170.

The process 300 may include optimizing the cost function with respect to the set of parameters to generate a set of optimal parameters (350). This may, for instance, correspond to one or more components of system 100, such as value estimation engine 170 as described above in reference to FIGS. 1-2, optimizing the cost function, such as that which has been defined above by Equation 3, by iteratively adjusting the value of one or more parameters in the set of parameters with the objective of minimizing the cost J. That is, the values of the parameters may be changed from those originally assigned to each parameter on the basis of initial estimates. In some examples, optimizing the cost function with respect to the set of parameters may include performing gradient descent on the cost function with respect to each parameter in the set of parameters.

The process 300 may include obtaining, based on the generated set of optimal parameters, an updated estimate of the value of each property that is physically located within the particular set of communities (360). For example, this may correspond to one or more components of system 100, such as value estimation engine 170 as described above in reference to FIGS. 1-2, obtaining updated estimates for one or more properties for which listing information is included in one or more resources that are accessible to or maintained by system 100. Such updated estimates may, for instance, be obtained for each type of property through use of Equation 2 as described above in reference to FIG. 1. In the example of FIG. 2, such updated estimates may be those on the basis of which elements 226, 234, and/or 236 are generated.

In some implementations, selecting, from among the different communities, the particular set of communities within which multiple, different properties are physically located, where the multiple, different properties that are physically located within the particular set of communities represent a particular quantity of different types of properties may include determining, based on the listing information, that the particular set of communities satisfy a set of criteria. In some of such implementations, the listing information may indicate each community's geographic location, and determining, based on the listing information, that the particular set of communities satisfy the set of criteria may include determining, based on the listing information, that each community included in the particular set of communities is geographically located within a predefined geographic region. This may, for instance, correspond to one or more components of system 100, such as location based search engine 140 and/or value estimation engine 170 as described above in reference to FIGS. 1-2, selecting two or more communities that are geographically close to one another. As mentioned above, selecting communities that are geographically close to one another may, in some situations, enable the value estimation engine 170 to develop a set of parameters C for such communities that yield relatively accurate value estimates. Such a predefined geographic region may, for instance, be specified by one or more users that access system 100 or may be determined by system 100 based on one or more factors, and may correspond to a neighborhood, a city block, a burrow, a zip code, a town, and the like.

In some examples, process 300 may further include indexing each type of property that is physically located within the particular set of communities according to one or more features of the each type of property as indicated in the listing information. For example, this may correspond to one or more components of system 100, such as value estimation engine 170 as described above in reference to FIGS. 1-2, indexing various types of property by various property features, at least a portion of which may correspond to those having been described above, in reference to FIG. 2, as being specified through search query interface 202. In such examples, the one or more features may, in some instances, include a quantity of bedrooms and/or a quantity of bathrooms that are included in each type of property. In addition, the one or more features may, in some of such instances, further include a quantity of parking spots included with each type of property, a quantity of balconies or patios included with each type of property, and/or a size of each type of property.

In some implementations, process 300 may further include, in response to selecting the particular set of communities, determining, based on the listing information, a value of each property included in a subset of the properties that are physically located within the particular set of communities. This may, for instance, correspond to one or more components of system 100, such as value estimation engine 170 as described above in reference to FIGS. 1-2, determining x-values for each property in a given group of communities for which values are known, as indicated in the listing information that corresponds to such properties. In such implementations, obtaining an initial estimate of the value of each property that is physically located within the particular set of communities may include obtaining, based on the determined values of the subset of properties, an initial estimate of the value of each property that is physically located within the particular set of communities. In some of such implementations, the cost function may further depend on the determined values of the subset of properties.

In some examples, obtaining an initial estimate of the value of each property that is physically located within the particular set of communities may, in such implementations, determining, based on the determined values of the subset of properties, a naïve initial estimate of the value of each property that is physically located within the particular set of communities. For instance, determining a naïve initial estimate may include applying linear interpolation to the determined values of the subset of properties.

In some of such examples, the cost function is given by:

$$J(C, G) = \frac{1}{m} \sum_{(b,i) \in G} (x_{b,i} - estimate_{b,i})^2$$

In the cost function, C represents the set of parameters, G represents the particular set of communities, b represents an index for each community included in the particular set of communities, i represents an index for each of the multiple, different types of properties that are physically located within the particular set of communities, m represents a quantity of the determined values of the subset of properties, $x\_(b,i)$ represents a determined value of a property of type i that is physically located within community b, and $\hat{}$ estimate$\hat{}$ _(b,i) represents an estimate of the value of a property of type i that is physically located within community b, where each $\hat{}$ estimate$\hat{}$ _(b,i) is dependent on the set of parameters C.

In addition, $estimate_{b,i}$ may, in some instances, be given by:

$$estimate_{b,i} = \text{mean}\left(\frac{x_{b,1}}{c_1}, \ldots, \frac{x_{b,n}}{c_n}\right) * c_i,$$

In this equation, n represents a total quantity of the multiple, different types of properties that are physically located within the particular set of communities.

In some of such implementations, obtaining, based on the generated set of optimal parameters, an updated estimate of the value of each property that is physically located within the particular set of communities may include, for each property of type i that is physically located within community b and is not included in the subset of properties, determining a ratio of the determined value of each property that is physically located within community b and is included in the subset of properties divided by the optimal parameter that corresponds to the type of each property that is physically located within community b and is included in the subset of properties, respectively, determining a mean value of the determined ratios, and multiplying the determined mean value by the optimal parameter that corresponds to properties of type i. This may, for instance, correspond to one or more components of system 100, such as value estimation engine 100 as described above in reference to FIGS. 1-2, determining a mean value, $\mu_b$, for each community in a given group of communities, and multiplying $\mu_b$ by the particular parameter, from among the set of parameters, that corresponds to a given unit of type n so as to obtain an estimate$_{b,i}$ of the value of the given unit of type n that is included in one of the selected communities. Such mean values may, for instance, be determined for each community through use of Equation 1 as described above in reference to FIG. 1. Similarly, such estimates may, for example, be obtained for each property/unit in each selected community through use of Equation 2 as described above in reference to FIG. 2.

In some of such implementations, the listing information (i) specifies the values of the subset of the properties that are physically located within the particular set of communities, and (ii) does not specify the values of properties that are physically located within the particular set of communities other than the subset of properties. For example, this may correspond to one or more components of system 100, such as value estimation engine 170 as described above in reference to FIGS. 1-2, having access to pricing information for some, but not all of the properties in a selected set of communities.

In some examples, the value of each property that is physically located within the particular set of communities may be a recurring rental value of each property. For example, such a recurring rental value may be a monthly, weekly, or monthly rental fee that the tenant of the property is to one or more entities that manage the property. In other implementations, the value of each property that is physically located within the particular set of communities may be a total value of each property. For example, such a total value may be the price at which the property may be purchased.

The value estimation engine 170 may, for instance, perform process 300 on a scheduled basis or each time new listing information becomes available to system 100 and, in some implementations, store one or more previously-obtained estimates. In such implementations, the value estimation engine 170 may, for example, perform statistical analyses on one or more previously-obtained estimates and/or current estimates. In some examples, the system 100 may leverage one or more machine learning techniques with such estimates and listing information so as to identify pricing trends, select new sets of communities for use in property value estimation, and the like.

In some implementations, at least a portion of process 300 may be executed through use of a neural network. For example, implementation of the techniques described herein through the use of one or more neural networks may be embodied in methods that may include the actions of providing training data to a neural network that includes an output layer and one or more hidden layers, each of the hidden layers comprising multiple nodes and corresponding parameters, calculating a gradient for the neural network by applying a cost function output layer activation function to the output layer, where the cost function output layer activation function is dependent on the training data and parameters, and training the neural network using the gradient to predict a value that represents a rental cost of a unit type in a particular area represented by input data received by the neural network, where training the neural network using the gradient includes using the gradient to update the parameters.

In some of such implementations, the training data may include, for each of one or more unit types, features of the unit type and a known rental cost value of the unit type. Features of the unit type may, in some examples, include one or more of (i) number of bedrooms, (ii) number of bathrooms, (iii) size in square meters, (iv) level in which the unit type is located, (v) garden, (vi) age of building in which unit type is located, and (vii) parking access. Some or all of such features may also be leveraged as features in implementations of process 300 as described above in reference to FIG. 3 that do not involve the use of neural networks.

The cost function output layer activation function may, in some of such implementations, be given by $$J(C, G) = \frac{1}{m} \sum_{(b,i) \in G} (x_{b,i} - estimate_{b,i})^2$$

where C represents the set of parameters, G represents the particular area, b represents an index for one or more buildings in the particular area, i represents an index for each unit type in the particular area, m represents a number of known rental cost values, $x_{b,i}$ represents a known rental cost value for unit type i in building b, and estimate$_{b,i}$ represents an estimate of a rental cost value for unit type i in building b as calculated by processing a respective input through the neural network, where each estimate$_{b,i}$ is dependent on the set of parameters C.

Figure 4:
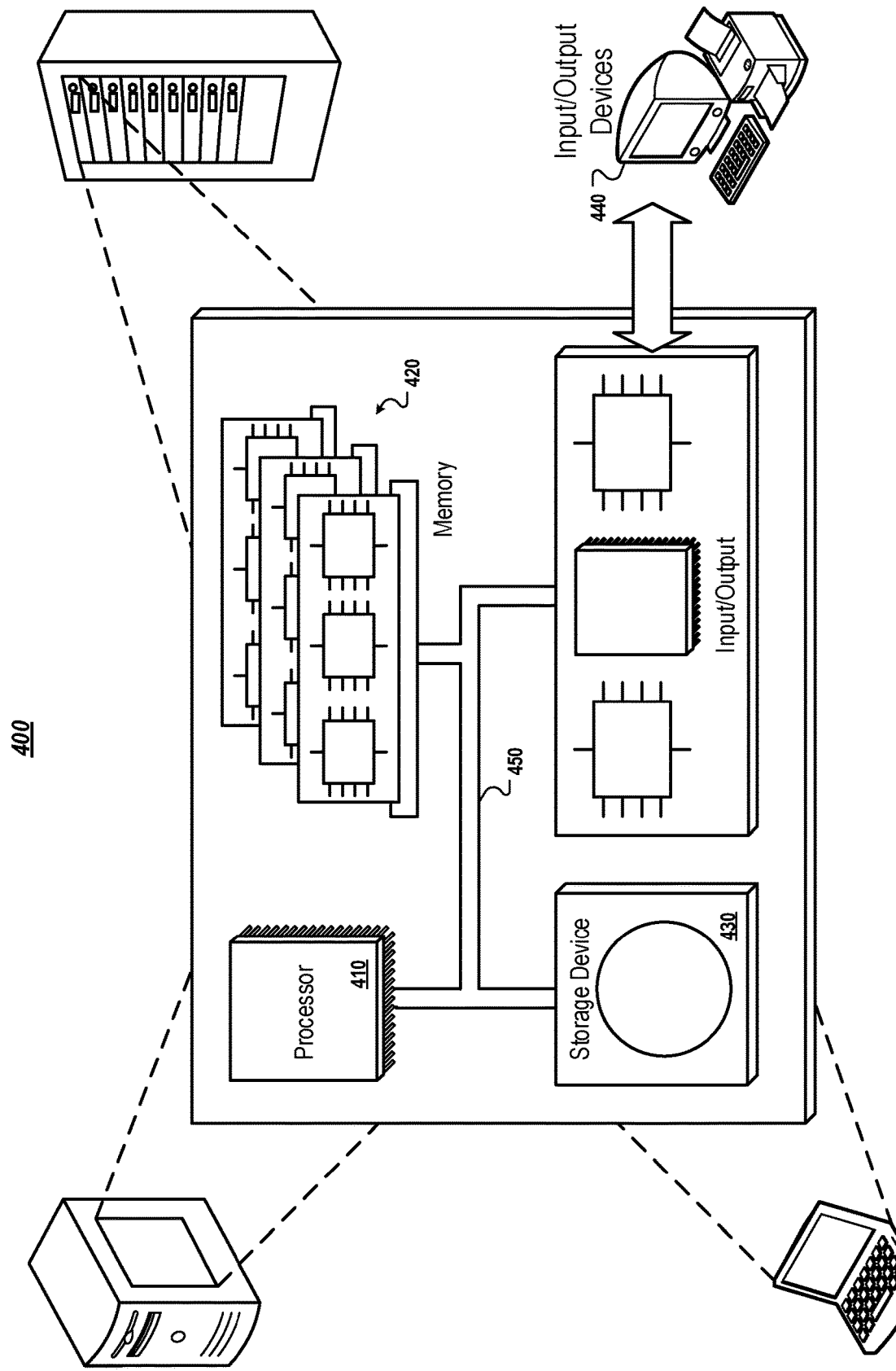
FIG. 4 is a diagram of exemplary computing devices.

FIG. 4 is a schematic diagram of an example of a generic computer system 400. The system 400 can be used for the operations described in association with FIGS. 1-3 according to some implementations. The system 400 may include system 100, may provide graphical user interface 200, and may perform process 300.

The system 400 includes a processor 410, a memory 420, a storage device 430, and an input/output device 440. Each of the components 410, 420, 430, and 440 are interconnected using a system bus 450. The processor 410 is capable of processing instructions for execution within the system 400. In one implementation, the processor 410 is a single-threaded processor. In another implementation, the processor 410 is a multi-threaded processor. The processor 410 is capable of processing instructions stored in the memory 420 or on the storage device 430 to display graphical information for a user interface on the input/output device 440.

The memory 420 stores information within the system 400. In one implementation, the memory 420 is a computer-readable medium. In one implementation, the memory 420 is a volatile memory unit. In another implementation, the memory 420 is a non-volatile memory unit.

The memory 420 stores information within the system 400. In one implementation, the memory 420 is a computer-readable medium. In one implementation, the memory 420 is a volatile memory unit. In another implementation, the memory 420 is a non-volatile memory unit.

The storage device 430 is capable of providing mass storage for the system 400. In one implementation, the storage device 430 is a computer-readable medium. In various different implementations, the storage device 430 may be a floppy disk device, a hard disk device, an optical disk device, or a tape device.

The input/output device 440 provides input/output operations for the system 400. In one implementation, the input/output device 440 includes a keyboard and/or pointing device. In another implementation, the input/output device 440 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method comprising:
receiving, by an indexer of a search engine system that includes (i) the indexer, (ii) a search engine, (iii) a ranking engine, (iv) a database and (v) a value estimation engine, first listing information that (a) includes, for a particular web resource that has a first resource type from a plurality of multiple, different resource types, first values for each of one or more first attributes and (b) omits a particular value for a second attribute for the particular web resource;
storing, by the indexer and in the database, the received first listing information that omits the particular value for the particular web resource;
maintaining, in the database and for each of two or more web resources that are different web resources than the particular web resource, second listing information that includes second values for each of the one or more first attributes and a third value for the second attribute, the two or more web resources including a second web resource and a third web resource and each having a different resource type from the plurality of multiple, different resource types than the first resource type for the particular web resource;
receiving, by the search engine and from a client device, a search query that identifies a range for the second attribute;
in response to receiving the search query:
determining, by the search engine, that the second web resource is responsive to the search query and that the third web resource is not responsive to the search query using the respective values for the one or more first attributes and the second attribute and the search query including the range; and
accessing, by the value estimation engine, listing information for multiple, different sets of web resources that are each associated with a resource type from the plurality of multiple, different resource types;
selecting, by the value estimation engine and from among the different sets of web resources and using at least some of the first values for the one or more first attributes, a particular set of web resources that includes the two or more web resources including the second web resource and the third web resource based on at the least some of the first values for the first attributes for the particular web resource being similar to respective second values for the one or more first attributes for the two or more second web resources, each of the two or more web resources having a different resource type from the plurality of multiple, different resource types than the first resource type for the particular web resource;
determining, by the value estimation engine, that the stored listing information for the particular web resource omits the particular value;
obtaining, by the value estimation engine and for each of the two or more web resources including the second web resource and the third web resource, an initial estimate of the second attribute using a respective parameter from a set of parameters that corresponds to the respective resource type of the respective web resource, the set of parameters including one parameter for each of the multiple, different resource types;

optimizing, by the value estimation engine, the parameters in the set of parameters using a cost function and the initial estimate of the second attribute for each of the two or more web resources that each have a different resource type from the plurality of multiple, different resource types than the first resource type for the particular web resource and includes the second web resource and the third web resource;

obtaining, by the value estimation engine, an estimate of the particular value for the particular resource that is omitted from the stored listing information using a set of optimal parameters that were optimized using the initial estimate of the second attribute for each of the two or more web resources that each have a different resource type from the plurality of multiple, different resource types than the first resource type for the particular web resource and that includes the second web resource and the third web resource;

determining, by the search engine, that the particular web resource is responsive to the search query using the first values for the one or more first attributes and the estimate of the particular value for the second attribute and the search query including the range;

ranking, by the ranking engine, the particular web resource and the second web resource that are responsive to the search query; and providing, by the search engine system and to the client device, web page data that includes ranked data for the second web resource and the particular web resource including the listing information for the particular resource, the estimate of the particular value for the particular web resource that is omitted from the stored listing information to the received search query, and data for a web page component that indicates that the estimate of the particular value is an estimated value.

2. The computer-implemented method of claim 1, comprising:

in response to selecting the particular set of web resources, determining, based on the listing information, a value of each web resource included in a subset of the web resources that are associated with an entity physically located near entities associated with the particular set of web resources;

wherein obtaining, for each of the two or more web resources including the second web resource and the third web resource, an initial estimate of the second attribute comprises obtaining, based on the determined values of the subset of web resources, the initial estimate of the second attribute.

3. The computer-implemented method of claim 2, wherein obtaining an initial estimate of the second attribute comprises determining, based on the determined values of the subset of web resources, a naïve initial estimate of the second attribute.

4. The computer-implemented method of claim 3, wherein determining the naïve initial estimate comprises applying linear interpolation to the determined values of the subset of web resources.

5. The computer-implemented method of claim 3, wherein the cost function satisfies:

$$J(C, G) = \frac{1}{m} \sum_{(b,i) \in G} (x_{b,i} - estimate_{b,i})^2$$

wherein C represents the set of parameters, G represents the particular set of web resources, b represents an index for each web resource included in the particular set of web resources, i represents an index for each of the multiple, different resource types that are associated with an entity physically located near entities associated with the particular set of web resources, m represents a quantity of the determined values of the subset of web resources, $x_{b,i}$ represents a determined value of a web resource of resource type i that is associated with an entity physically located near entities associated with set of web resources b, and $estimate_{b,i}$ represents an estimate of the value of a web resource of resource type i that is associated with an entity physically located near entities associated with set of web resources b, wherein each $estimate_{b,i}$ is dependent on the set of parameters C.

6. The computer-implemented method of claim 5, wherein $$estimate_{b,i} = \text{mean}\left(\frac{x_{b,2}}{c_2}, \ldots, \frac{x_{b,n}}{c_n}\right) * c_i,$$

and wherein n represents a total quantity of the multiple, different resource types that are associated with an entity physically located near entities associated with the particular set of web resources, and $c_i$ represents a set of parameters C.

7. The computer-implemented method of claim 2, wherein obtaining, based on the set of optimal parameters, an estimate of the particular web resource comprises, for each resource of resource type i that is associated with an entity physically located near entities associated with set of web resources b and that is not included in the subset of web resources:

determining a ratio of the determined value for the second attribute of each web resource that is associated with an entity physically located near entities associated with set of web resources b and that is included in the subset of web resources, divided by the optimal parameter that corresponds to the resource type of each web resource that is associated with an entity physically located near entities associated with set of web resources b and that is included in the subset of web resources, respectively;

determining a mean value of the determined ratios; and multiplying the determined mean value by the optimal parameter that corresponds to web resources of resource type i.

8. The computer-implemented method of claim 2, wherein the cost function further depends on the third values of the subset of web resources for the second attribute.

9. The computer-implemented method of claim 2, wherein the listing information (i) specifies the values of the subset of the web resources that are associated with an entity physically located near entities associated with the particular set of web resources, and (ii) does not specify the values of web resources that are associated with an entity physically located near entities associated with the particular set of web resources other than the subset of web resources.

10. The computer-implemented method of claim 1, wherein optimizing the parameters in the set of parameters using the cost function comprises performing gradient descent on the cost function with respect to each parameter in the set of parameters.

11. The computer-implemented method of claim 1, further comprising:

indexing each resource type that is associated with an entity physically located near entities associated with within the particular set of web resources according to one or more attributes of the each resource type as indicated in the listing information.

12. The computer-implemented method of claim 11, wherein the one or more attributes include a quantity of bedrooms and/or a quantity of bathrooms that are included in each resource type.

13. The computer-implemented method of claim 12, wherein the one or more attributes further include a quantity of parking spots included with each resource type, a quantity of balconies or patios included with each resource type, or a size of each resource type.

14. The computer-implemented method of claim 1, wherein the particular value comprises a recurring rental value associated with the particular web resource.

15. A computer program product, encoded on one or more non-transitory computer storage media, comprising instructions that when executed by one or more computers cause the one or more computers to perform operations comprising:
receiving, by an indexer of a search engine system that includes (i) the indexer, (ii) a search engine, (iii) a ranking engine, (iv) a database and (v) a value estimation engine, first listing information that (a) includes, for a particular web resource that has a first resource type from a plurality of multiple, different resource types, first values for each of one or more first attributes and (b) omits a particular value for a second attribute for the particular web resource;
storing, by the indexer and in the database, the received first listing information that omits the particular value for the particular web resource;
maintaining, in the database and for each of two or more web resources that are different web resources than the particular web resource, second listing information that includes second values for each of the one or more first attributes and a third value for the second attribute, the two or more web resources including a second web resource and a third web resource and each having a different resource type from the plurality of multiple, different resource types than the first resource type for the particular web resource;
receiving, by the search engine and from a client device, a search query that identifies a range for the second attribute;
in response to receiving the search query:
determining, by the search engine, that the second web resource is responsive to the search query and that the third web resource is not responsive to the search query using the respective values for the one or more first attributes and the second attribute and the search query including the range; and
accessing, by the value estimation engine, listing information for multiple, different sets of web resources that are each associated with a resource type from the plurality of multiple, different resource types;
selecting, by the value estimation engine and from among the different sets of web resources and using at least some of the first values for the one or more first attributes, a particular set of web resources that includes the two or more web resources including the second web resource and the third web resource based on the at least some of the first values for the first attributes for the particular web resource being similar to respective second values for the one or more first attributes for the two or more second web resources, each of the two or more web resources having a different resource type from the plurality of multiple, different resource types than the first resource type for the particular web resource;
determining, by the value estimation engine, that the stored listing information for the particular web resource omits the particular value;
obtaining, by the value estimation engine and for each of the two or more web resources including the second web resource and the third web resource, an initial estimate of the second attribute using a respective parameter from a set of parameters that corresponds to the respective resource type of the respective web resource, the set of parameters including one parameter for each of the multiple, different resource types;
optimizing, by the value estimation engine, the parameters in the set of parameters using a cost function and the initial estimate of the second attribute for each of the two or more web resources that each have a different resource type from the plurality of multiple, different resource types than the first resource type for the particular web resource and includes the second web resource and the third web resource;
obtaining, by the value estimation engine, an estimate of the particular value for the particular resource that is omitted from the stored listing information using a set of optimal parameters that were optimized using the initial estimate of the second attribute for each of the two or more web resources that each have a different resource type from the plurality of multiple, different resource types than the first resource type for the particular web resource and that includes the second web resource and the third web resource;
determining, by the search engine, that the particular web resource is responsive to the search query using the first values for the one or more first attributes and the estimate of the particular value for the second attribute and the search query including the range;
ranking, by the ranking engine, the particular web resource and the second web resource that are responsive to the search query; and
providing, by the search engine system and to the client device, web page data that includes ranked data for the second web resource and the particular web resource including the listing information for the particular resource, the estimate of the particular value for the particular web resource that is omitted from the stored listing information to the received search query, and data for a web page component that indicates that the estimate of the particular value is an estimated value.

16. The computer program product of claim 15, comprising:
in response to selecting the particular set of web resources, determining, based on the listing information, a value of each web resource included in a subset of the web resources that are associated with an entity physically located near entities associated with the particular set of web resources;
wherein, for each of the two or more web resources including the second web resource and the third web resource, obtaining an initial estimate of the second attribute comprises obtaining, based on the determined values of the subset of web resources, the initial estimate of the second attribute.

17. The computer program product of claim 16, wherein obtaining an initial estimate of the second attribute comprises determining, based on the determined values of the subset of web resources, a naïve initial estimate of the second attribute.

18. The computer program product of claim 17, wherein determining the naïve initial estimate comprises applying linear interpolation to the determined values of the subset of web resources.

19. The computer program product of claim 16, wherein the cost function satisfies:

$$J(C, G) = \frac{1}{m} \sum_{(b,i) \in G} (x_{b,i} - estimate_{b,i})^2$$

wherein C represents the set of parameters, G represents the particular set of web resources, b represents an index for each web resource included in the particular set of web resources, i represents an index for each of the multiple, different resource types that are associated with an entity physically located near entities associated with the particular set of resources, m represents a quantity of the determined values of the subset of web resources, $x_{b,i}$ represents a determined value of a web resource of resource type i that is associated with an entity physically located near entities associated with set of web resources b, and $estimate_{b,i}$ represents an estimate of the value of a web resource of resource type i that is associated with an entity physically located near entities associated with set of web resources b, wherein each $estimate_{b,i}$ is dependent on the set of parameters C.

20. A search engine system that includes (i) an indexer, (ii) a search engine, (iii) a ranking engine, (iv) a database and (v) a value estimation engine, the search engine system comprising:
  one or more computers and one or more storage devices storing instructions that are operable, when executed by the one or more computers, to cause the one or more computers to perform operations comprising:
    receiving, by the indexer, first listing information that (a) includes, for a particular web resource that has a first resource type from a plurality of multiple, different resource types, first values for each of one or more first attributes and (b) omits a particular value for a second attribute for the particular web resource;
    storing, by the indexer and in the database, the received first listing information that omits the particular value for the particular web resource;
    maintaining, in the database and for each of two or more web resources that are different web resources than the particular web resource, second listing information that includes second values for each of the one or more first attributes and a third value for the second attribute, the two or more web resources including a second web resource and a third web resource and each having a different resource type from the plurality of multiple, different resource types than the first resource type for the particular web resource;
    receiving, by the search engine and from a client device, a search query that identifies a range for the second attribute;
    in response to receiving the search query:
      determining, by the search engine, that the second web resource is responsive to the search query and that the third web resource is not responsive to the search query using the respective values for the one or more first attributes and the second attribute and the search query including the range; and
      accessing, by the value estimation engine, listing information for multiple, different sets of web resources that are each associated with a resource type from the plurality of multiple, different resource types;
    selecting, by the value estimation engine and from among the different sets of web resources and using at least some of the first values for the one or more first attributes, a particular set of web resources that includes the two or more web resources including the second web resource and the third web resource based on at the least some of the first values for the first attributes for the particular web resource being similar to respective second values for the one or more first attributes for the two or more second web resources, each of the two or more web resources having a different resource type from the plurality of multiple, different resource types than the first resource type for the particular web resource;
    determining, by the value estimation engine, that the stored listing information for the particular web resource omits the particular value;
    obtaining, by the value estimation engine and for each of the two or more web resources including the second web resource and the third web resource, an initial estimate of the second attribute using a respective parameter from a set of parameters that corresponds to the respective resource type of the respective web resource, the set of parameters including one parameter for each of the multiple, different resource types;
    optimizing, by the value estimation engine, the parameters in the set of parameters using a cost function and the initial estimate of the second attribute for each of the two or more web resources that each have a different resource type from the plurality of multiple, different resource types than the first resource type for the particular web resource and includes the second web resource and the third web resource;
    obtaining, by the value estimation engine, an estimate of the particular value for the particular resource that is omitted from the stored listing information using a set of optimal parameters that were optimized using the initial estimate of the second attribute for each of the two or more web resources that each have a different resource type from the plurality of multiple, different resource types than the first resource type for the particular web resource and that includes the second web resource and the third web resource;
    determining, by the search engine, that the particular web resource is responsive to the search query using the first values for the one or more first attributes and the estimate of the particular value for the second attribute and the search query including the range;
    ranking, by the ranking engine, the particular web resource and the second web resource that are responsive to the search query; and
    providing, by the search engine system and to the client device, web page data that includes ranked data for the second web resource and the particular web resource including the listing information for the particular resource, the estimate of the particular value for the particular web resource that is omitted from the stored listing information to the received search query, and data for a web page component that indicates that the estimate of the particular value.

* * * * *

UNITED STATES PATENT AND TRADEMARK OFFICE
CERTIFICATE OF CORRECTION

PATENT NO. : 10,789,278 B1
APPLICATION NO. : 15/639236
DATED : September 29, 2020
INVENTOR(S) : Robert Berton Jennings, Jack Spivey and Andrew Florance Page 1 of 1

It is certified that error appears in the above-identified patent and that said Letters Patent is hereby corrected as shown below:

In the Claims

Claim 11, Column 31, Line 3, before "the" delete "within".

Signed and Sealed this
Second Day of February, 2021

Drew Hirshfeld
*Performing the Functions and Duties of the*
*Under Secretary of Commerce for Intellectual Property and*
*Director of the United States Patent and Trademark Office*